(12) United States Patent
Zhang et al.

(10) Patent No.: US 10,809,600 B2
(45) Date of Patent: Oct. 20, 2020

(54) GIMBAL, PHOTOGRAPHING ASSEMBLY AND UNMANNED AERIAL VEHICLE (UAV) THAT HAVE GIMBAL

(71) Applicant: AUTEL ROBOTICS CO., LTD., Shenzhen, Guangdong (CN)

(72) Inventors: Zhengli Zhang, Guangdong (CN); Songtao Chang, Guangdong (CN); Feng Ni, Guangdong (CN)

(73) Assignee: AUTEL ROBOTICS CO., LTD., Shenzhen, Guangdon (CN)

( * ) Notice: Subject to any disclaimer, the term of this patent is extended or adjusted under 35 U.S.C. 154(b) by 0 days.

(21) Appl. No.: 16/733,886

(22) Filed: Jan. 3, 2020

(65) Prior Publication Data
US 2020/0142283 A1 May 7, 2020

Related U.S. Application Data

(63) Continuation of application No. PCT/CN2018/082218, filed on Apr. 8, 2018.

(30) Foreign Application Priority Data

Jul. 4, 2017 (CN) .......................... 2017 1 0538222

(51) Int. Cl.
*G03B 17/56* (2006.01)
*B64C 39/02* (2006.01)
(Continued)

(52) U.S. Cl.
CPC .......... *G03B 17/561* (2013.01); *B64C 39/024* (2013.01); *B64D 47/08* (2013.01);
(Continued)

(58) Field of Classification Search
CPC combination set(s) only.
See application file for complete search history.

(56) References Cited

U.S. PATENT DOCUMENTS

| 10,183,762 B2* | 1/2019 | Zhao .................. F16M 11/2057 |
| 2015/0053833 A1 | 2/2015 | St. Louis |
| 2017/0227831 A1* | 8/2017 | Tang .................... G03B 17/561 |

FOREIGN PATENT DOCUMENTS

| CN | 104075093 A | 10/2014 |
| CN | 105864606 A | 8/2016 |

(Continued)

OTHER PUBLICATIONS

International Search Report dated Jun. 22, 2018; PCT/CN2018/082218.

*Primary Examiner* — Minh Q Phan

(57) ABSTRACT

The present invention relates to the technical field of aircrafts, and provides a gimbal, a photographing assembly and an unmanned aerial vehicle (UAV) that have the gimbal. The gimbal includes: a first rotating member and a second rotating member. The first rotating member includes a first drive apparatus, the first drive apparatus including a first rotating portion, and the second rotating member includes a second drive apparatus and a first connecting arm, the second drive apparatus including a second fixing portion and a second rotating portion that may rotate relative to the second fixing portion, the first connecting arm being fixedly connected between the first rotating portion and the second fixing portion, and the first connecting arm is integrally formed with the first rotating portion and the second fixing portion.

6 Claims, 4 Drawing Sheets

(51) Int. Cl.
*B64D 47/08* (2006.01)
*G03B 15/00* (2006.01)

(52) U.S. Cl.
CPC ...... *G03B 15/006* (2013.01); *B64C 2201/027* (2013.01); *B64C 2201/127* (2013.01)

(56) References Cited

FOREIGN PATENT DOCUMENTS

| | | |
|---|---|---|
| CN | 205427415 U | 8/2016 |
| CN | 106787277 A | 5/2017 |
| CN | 206202715 U | 5/2017 |
| CN | 207258006 U | 4/2018 |

\* cited by examiner

GIMBAL, PHOTOGRAPHING ASSEMBLY AND UNMANNED AERIAL VEHICLE (UAV) THAT HAVE GIMBAL

CROSS-REFERENCE

This application is a continuation of International Patent Application No. PCT/CN2018/082218 filed on Apr. 8, 2018, which claims priority to Chinese Patent Application No. 201710538222.2 filed on Jul. 4, 2017, both of which are incorporated by reference herein in their entireties.

BACKGROUND

Technical Field

The present invention relates to the technical field of unmanned aerial vehicles, and in particular, to a gimbal, a photographing assembly and an unmanned aerial vehicle (UAV) that have the gimbal.

Related Art

An unmanned aerial vehicle (UAV for short) is a new concept device under rapid development, which has the advantages of maneuverability, quick response, unmanned operation and low operation requirements. The UAV carries a plurality of types of sensors or photographing devices, to implement real-time image transmission and detection of high-risk areas, which is a powerful complement to satellite remote sensing and traditional aerial remote sensing. At present, the range of use of UAVs has been expanded to three major areas such as military, scientific research and civilian use, and specifically widely used in fields such as power communication, meteorology, agriculture, marine, exploration, photography, disaster prevention and mitigation, crop evaluation, anti-drug and anti-smuggling, border patrol, public security and counter terrorism, etc.

During implementation of the present invention, the inventor finds at least the following problems existing in the prior art. In the existing gimbal design, a size of the gimbal is relatively large, and accuracy of controlling a load carried on the gimbal is poor.

SUMMARY

In order to resolve the foregoing technical problem, embodiments of the present invention provides a gimbal with a compact structure and high control accuracy, and a photographing assembly and an unmanned aerial vehicle (UAV) that have the gimbal.

In order to resolve the foregoing technical problem, the embodiments of the present invention provide the following technical solutions.

A gimbal configured to carry a load, the load including a camera and a housing, the camera being disposed in the housing, and the gimbal including: a first rotating member and a second rotating member, the first rotating member including a first drive apparatus, and the first drive apparatus including a first rotating portion; the second rotating member includes a second drive apparatus and a first connecting arm, the second drive apparatus including a second fixing portion and a second rotating portion that may rotate relative to the second fixing portion, the first connecting arm being fixedly connected between the first rotating portion and the second fixing portion, and the first connecting arm is integrally formed with the first rotating portion and the second fixing portion.

In some embodiments, the first drive apparatus includes a first fixing portion and a first rotating shaft, the first rotating portion rotating relative to the first fixing portion about the first rotating shaft; and the second drive apparatus includes a second rotating shaft, the second rotating portion rotating relative to the second fixing portion about the second rotating shaft.

In some embodiments, the gimbal includes a third rotating member, the third rotating member including: a third drive apparatus and a second connecting arm, the third drive apparatus including a third fixing portion, a third rotating portion and a third rotating shaft, and the third rotating portion rotating relative to the third fixing portion about the third rotating shaft; and the second connecting arm being fixedly connected between the second rotating portion and the third fixing portion, and the third rotating portion being configured to be fixedly connected to the load and driving the load to rotate relative to the third fixing portion.

In some embodiments, at least one of the first drive apparatus, the second drive apparatus and the third drive apparatus is a disc-type motor.

In some embodiments, the second connecting arm is integrally formed with the second rotating portion and the third fixing portion.

In some embodiments, the load includes a camera and a housing, the camera being disposed in the housing; the third rotating portion being configured to be fixedly connected to the camera and the housing, and an axis of the third rotating shaft in the third drive apparatus and an optical axis of the camera overlapping.

In some embodiments, the load includes a camera and a housing, the camera being disposed in the housing; the third rotating portion being configured to be fixedly connected to the camera, the third fixing portion being configured to be fixedly connected to the housing, and an axis of the third rotating shaft in the third drive apparatus and an optical axis of the camera overlapping.

In some embodiments, the third rotating member includes a plurality of mounting posts, one end of the plurality of mounting posts being disposed on a connecting surface of the third rotating portion, and the other end being configured to clamp the camera.

In some embodiments, there are three mounting posts in total, which are uniformly distributed around the third rotating shaft and surround the third rotating shaft.

In some embodiments, the third rotating member includes a fixing base, the fixing base being a hollow cylinder; the mounting post being sleeved on the camera, and the mounting post and the camera being mounted in the fixing base.

In order to resolve the foregoing technical problem, the embodiments of the present invention further provide the following technical solutions.

A photographing assembly includes a load and the foregoing gimbal, the gimbal carrying the load.

In order to resolve the foregoing technical problem, the embodiments of the present invention further provide the following technical solutions.

A gimbal includes a fuselage, a load and the gimbal, the gimbal carrying the load, and a first rotating member in the gimbal being mounted to the fuselage.

In comparison to the prior art, in the gimbal of the embodiments of the present invention, the first connecting arm is integrally formed with the first rotating portion and the second fixing portion, so that the structure of the gimbal is compact, and the first connecting arm and the integrated structure formed by the first rotating portion and the second fixing portion have high strength with good fatigue resistance and shock resistance performance, so that when the load carried on the gimbal works, shaking or vibration is reduced, thereby improving accuracy and stability of controlling the load carried thereon by the gimbal.

BRIEF DESCRIPTION OF THE DRAWINGS

One or more embodiments are described by way of example with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding the present invention, the present invention is described in further detail below with reference to the accompanying drawings and specific embodiments. It should be noted that an element described as being "fixed" to another element may be directly on the other element, or one or more intervening components may be present. An element described as being "connected" to another element may be directly connected to the other element, or one or more intervening components may be present. As used in the specification, orientation or position relationships indicated by the terms such as "upper", "lower", "inside", "outside" and "bottom" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such terms should not be construed as limiting of the present invention. In addition, the terms such as "first", "second", and "third" are used only for the purpose of description, and should not be understood as indicating or implying relative importance.

Unless otherwise defined, all technical and scientific terms used herein have the same meaning as commonly understood by one of ordinary skill in the art to which the present invention belongs. The terms used in the specification of the present invention are merely used for describing specific embodiments, and are not intended to limit the present invention. As used herein, the term "and/or" includes any and all combinations of one or more related items listed.

In addition, the technical features provided in different embodiments of the present invention to be described below may be combined with each other as long as no conflict occurs.

Figure 1:
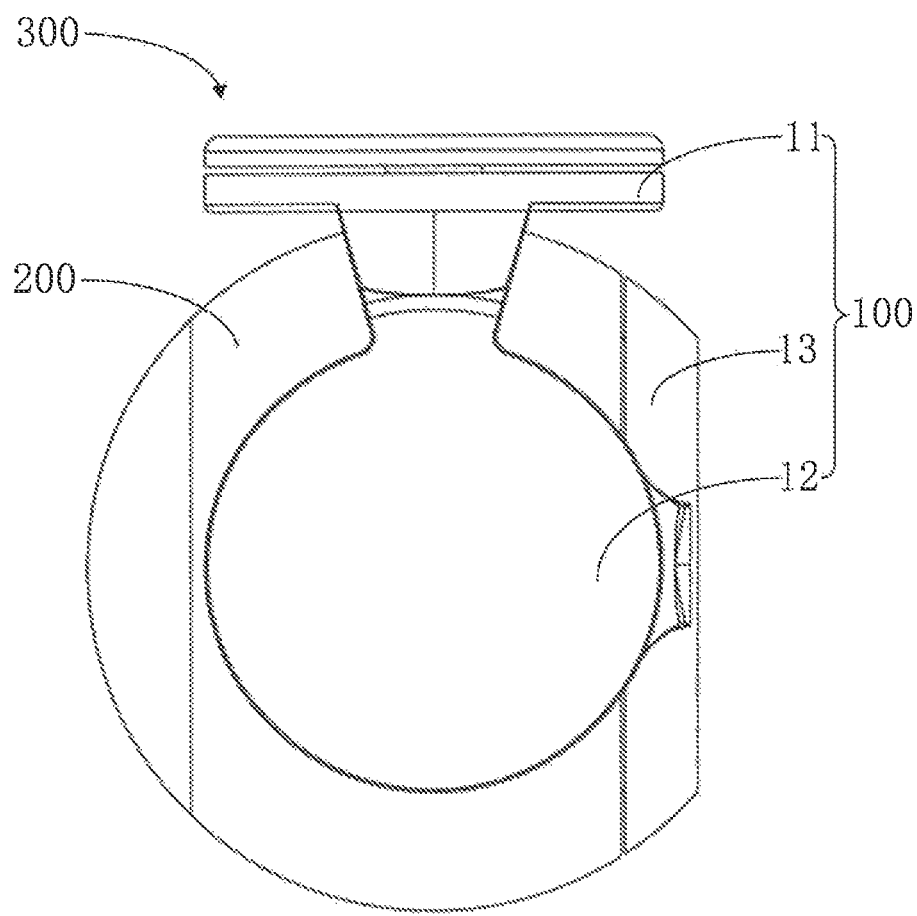
FIG. 1 is a simplified schematic structural diagram of a photographing assembly according to an embodiment of the present invention.

Referring to FIG. 1, an embodiment of the present invention provides a photographing assembly 300, including a gimbal 100 and a load 200 carried on the gimbal 100. The gimbal 100 may be configured to carry a load 200 to fix the load 200, or randomly adjust an attitude of the load 200 (for example, change a height, an inclination angle and/or a direction of the load 200), and cause the load 200 to be stably maintained at a set attitude. The load 200 may be an image obtaining apparatus, for example, a camera, a video camera, a camera, and the like, or other portable electronic devices, for example a mobile phone, a tablet computer and the like, and may also be a sensor understandably. The gimbal 100 may be used as an auxiliary apparatus for photography, photographing, monitoring, and sampling, which may be applied to, but not limited to, apparatuses such as a handheld shooting device, an unmanned aerial vehicle (UAV), an unmanned ship or an unmanned vehicle, etc. For example, the gimbal 100 may carry the image obtaining apparatus and is mounted onto the UAV for aerial photography. Alternatively, the gimbal 100 may also carry the image obtaining apparatus and mounted on a handle as a handheld shooting device for photographing, video recording and the like, and allows a user to manually operate the gimbal 100 to control a shooting angle of the image obtaining apparatus.

That the load 200 is used as a camera is used as an example, and the gimbal 100 is applied to the UAV to describe the present invention in detail.

The gimbal 100 is configured to carry the load 200. In this embodiment, the gimbal 100 is a three-axis omnidirectional gimbal. The gimbal 100 includes a first rotating member 11, a second rotating member 12 and a third rotating member 13. The first rotating member 11 is configured to be directly or indirectly mounted to a fuselage of the UAV through a shock absorption apparatus, the first rotating member 11 is connected to the second rotating member 12, the third rotating member 13 is connected to the second rotating member 12, and the third rotating member 13 is configured to mount the load 200.

The first rotating member 11, the second rotating member 12 and the third rotating member 13 include a drive apparatus, each drive apparatus includes a fixing portion and a rotating portion, and the rotating portion may rotate relative to the fixing portion.

It may be understood that, in some other embodiments, the gimbal 100 only includes a first rotating member 11 and a second rotating member 12. The first rotating member 11 is configured to be mounted to the fuselage of the UAV, the first rotating member 11 is connected to the second rotating member 12, and the second rotating member 12 is configured to mount the load 200.

In the embodiment of the present invention, each drive apparatus of the gimbal 100 respectively responds to a received rotation control signal, controls a rotating portion of the gimbal to rotate clockwise or anticlockwise relative to the fixing portion of the gimbal according to the control signal, and adjusts a rotating speed of the rotating portion, thereby achieving adjustment of the corresponding direction. Further, a direction, orientation and stability of the load 200 may be controlled. In the foregoing manner, the load 200 may obtain stable videos and/or pictures with corresponding perspectives. It may be understood that the gimbal 100 may also include a rotating member that rotates in one direction, two directions or more directions.

Figure 2:
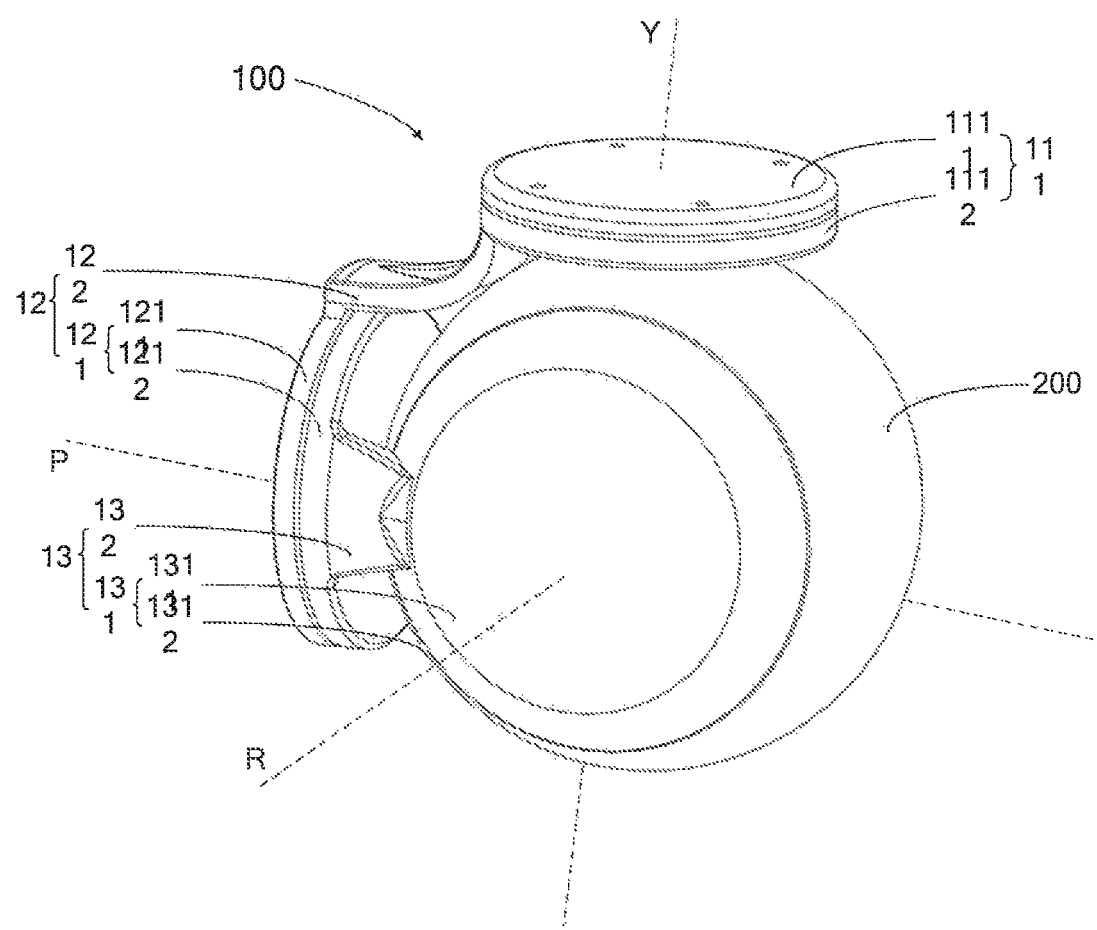
FIG. 2 is a schematic structural diagram of the photographing assembly shown in FIG. 1.
Figure 3:
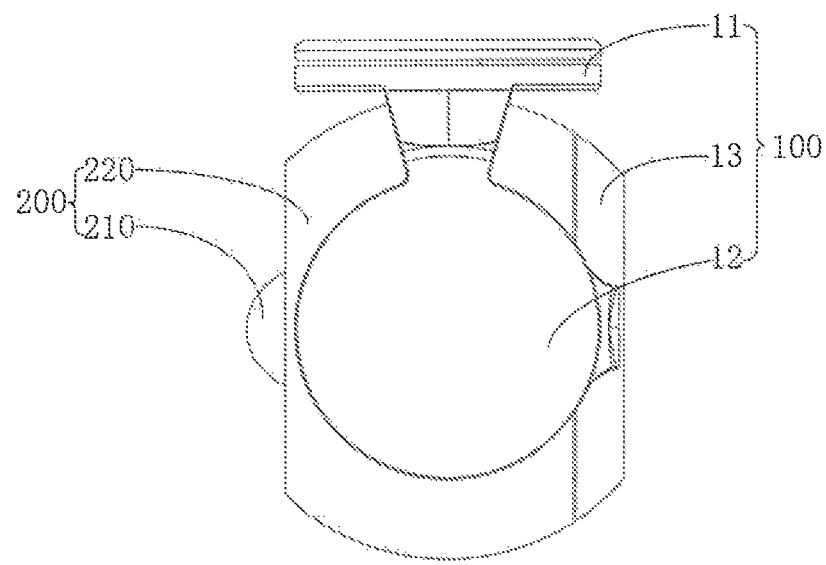
FIG. 3 is another schematic structural diagram of the photographing assembly shown in FIG. 2.

Referring to FIG. 2 and FIG. 3 together, the first rotating member 11 includes a first drive apparatus 111, the first drive apparatus 111 including a first fixing portion 1111, a first rotating portion 1112 and a first rotating shaft (not shown). The first rotating portion 1112 may rotate relative to the first fixing portion 1111 about the first rotating shaft (not shown). The first fixing portion 1111 is configured to be fixedly connected to the fuselage of the UAV.

In this embodiment, the second rotating member 12 includes a second drive apparatus 121 and a first connecting arm 122, the second drive apparatus 121 including a second fixing portion 1211, a second rotating portion 1212 and a second rotating shaft (not shown). The second rotating portion 1212 may rotate relative to the second fixing portion 1211 about the second rotating shaft (not shown). One end of the first connecting arm 122 is fixedly connected to the first rotating portion 1112, and the other end is fixedly connected to the second fixing portion 1211 of the second drive apparatus 121, so that when the first rotating portion 1112 of the first drive apparatus 111 rotates, the second rotating member 12 may be driven to rotate relative to the first fixing portion 1111 in the first rotating member 11. The first connecting arm 122 is integrally formed with the first rotating portion 1112 and the second fixing portion 1211, so that the structure of the gimbal 100 is more compact. In addition, due to reduction of corresponding fixing components, a weight of the gimbal 100 is also reduced.

Figure 5:
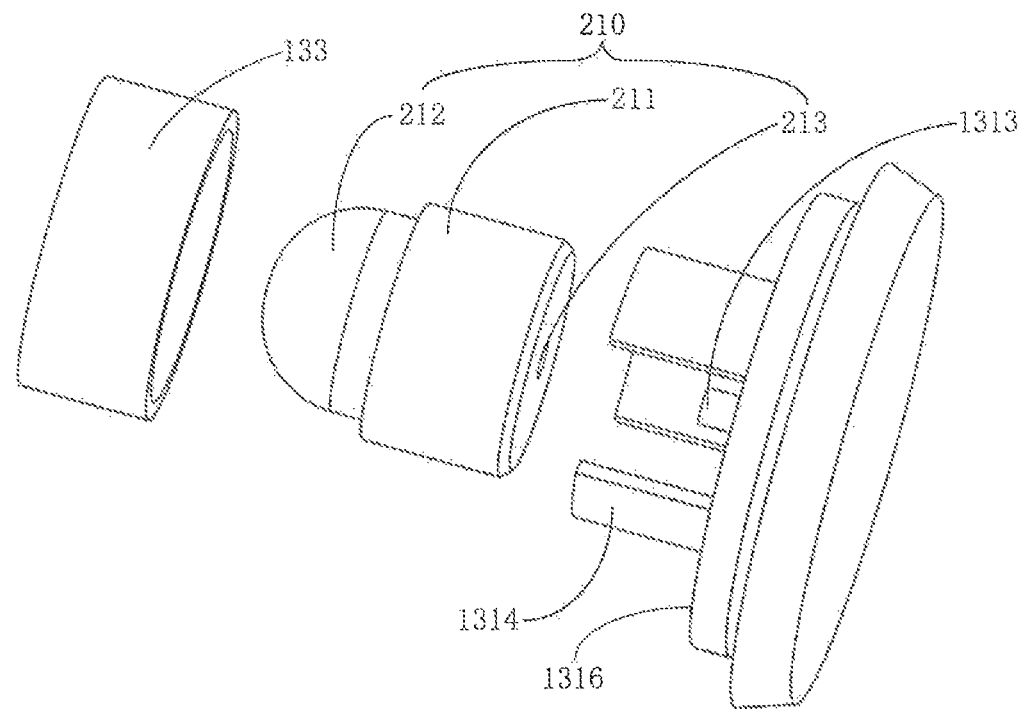
FIG. 5 is a schematic structural diagram of the third rotating member and the camera shown in FIG. 4.

In this embodiment, the third rotating member 13 includes a third drive apparatus 131 and a second connecting arm 132, the third drive apparatus 131 including a third fixing portion 1311, a third rotating portion 1312 and a third rotating shaft 1313 (as shown in FIG. 5). The third rotating portion 1312 may rotate relative to the third fixing portion 1311 about the third rotating shaft 1313. One end of the second connecting arm 132 is fixedly connected to the second rotating portion 1212, and the other end is fixedly connected to the third fixing portion 1311 of the third drive apparatus 131, so that when the second rotating portion 1212 of the second drive apparatus 121 rotates, the third rotating member 13 may be driven to rotate relative to the second fixing portion 1211 in the second rotating member 12. The third rotating portion 1312 is fixedly connected to the load 200, and is configured to drive the load 200 to rotate relative to the third fixing portion 1311. The second connecting arm 132 is integrally formed with the second rotating portion 1212 and the third fixing portion 1311, so that the structure of the gimbal 100 is more compact, in addition, due to reduction of corresponding fixing components, a weight of the gimbal 100 is also reduced.

In this embodiment, the first drive apparatus 111, the second drive apparatus 121 and the third drive apparatus 131 are all disc-type motors, so that the first drive apparatus 111, the second drive apparatus 121 and the third drive apparatus 131 have a very small axial length (that is, a thickness), which further reduces a volume of the gimbal 100, and the structure of the gimbal 100 is more compact.

In some other embodiments, the first drive apparatus 111, the second drive apparatus 121 and the third drive apparatus 131 may further be one of a brushless motor, a brushed motor or an air motor, respectively. Alternatively, the first drive apparatus 111, the second drive apparatus 121 and the third drive apparatus 131 may also be disc-type motors and a combination of other types of motors, that is, at least one of the first drive apparatus 111, the second drive apparatus 121 and the third drive apparatus 131 is a disc-type motor.

Further, in this embodiment, the first rotating member 11 controls the load 200 to rotate about a translation axis/a heading axis (in a Y axis direction shown in FIG. 2); the second rotating member 12 controls the load 200 to rotate about a pitch axis (in a P axis direction shown in FIG. 2); and the third rotating member 13 controls the load 200 to rotate about a roll axis (in an R axis direction shown in FIG. 2).

In some other embodiments, the first rotating member 11 controls the load 200 to rotate about a pitch axis; the second rotating member 12 controls the load 200 to rotate about a yaw axis; the third rotating member 13 controls the load 200 to rotate about a roll axis.

In this embodiment, the load 200 includes a camera 210 and a housing 220, The camera 210 is disposed in the housing 220, the camera 210 is fixedly connected to the housing 220, and the housing 220 is fixedly connected to the third rotating portion 1312. In addition, an optical axis of the camera 210 and an axis of the third rotating shaft in the third drive apparatus 131 overlap (that is, the optical axis of the camera 210 and the roll axis (the R axis) as well as the axis of the three rotating shaft overlap), so that the third rotating portion 1312 drives the housing 220 and the camera 210 to rotate around the roil axis. The benefits of this design are as follows. Both the third drive apparatus 131 and the camera 210 rotate around the roll axis, which is beneficial to improve the accuracy of controlling the camera 210 by the gimbal 100.

It may be understood that, in some other embodiments, the camera 210 is movably connected to the housing 220, and the camera 210 may rotate relative to the housing 220. The camera 210 is fixedly connected to the third rotating portion 1312, and the housing 220 is fixedly connected to the third fixing portion 1311. The optical axis of the camera 210 and the axis of the third rotating shaft in the third drive apparatus 131 overlap (that is, the optical axis of the camera 210 and the roll axis (the R axis) as well as the axis of the three rotating shaft overlap), so that the third rotating portion 1312 drives the camera 210 to rotate around the roll axis. In this case, since the housing 220 is fixedly connected to the third fixing portion 1311, the housing 220 does not rotate about the roll axis.

Figure 4:
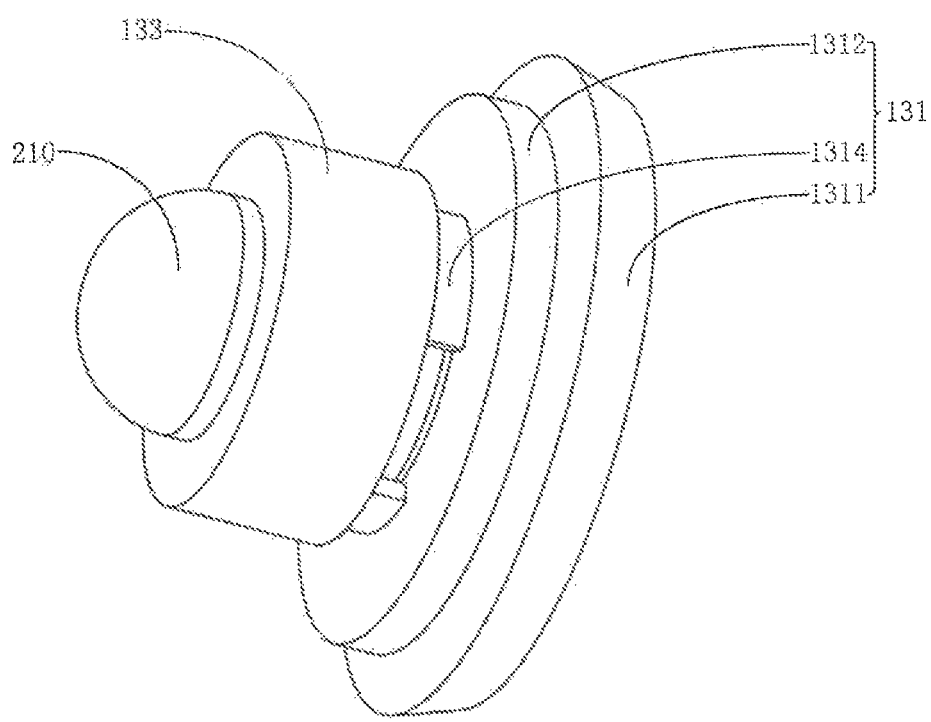
FIG. 4 is a schematic structural exploded view of a third rotating member and a camera of the gimbal shown in FIG. 2.
Figure 6:
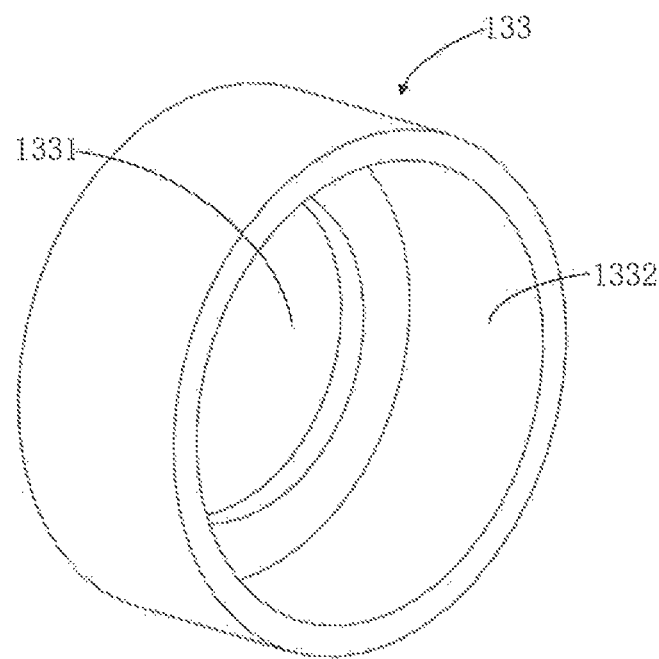
FIG. 6 is a schematic structural diagram of a fixing base of the camera shown in FIG. 5.

Referring to FIG. 4 to FIG. 6, the camera 210 includes a base 211, a head 212 and a threaded hole 213, the head 212 being fixed to one end of the base 211. The head 212 is hemispherical, and the base 211 is cylindrical. A diameter of the head 212 is less than a diameter of the base 211, and an axis of the head 212 and an axis of the base 211 overlap. The threaded hole 213 is disposed at the other end of the base 211 along an axis direction of the base 211, and the axis of the threaded hole 213 and the axis of the base 211 overlap. The third rotating shaft 1313 is received and fixed in the threaded hole 213.

The third rotating member 13 further includes a fixing base 133 for mounting and fixing the camera 210. The fixing base 133 is a hollow cylinder, of which one end is provided with a mounting hole 1331 and the other end is provided with a connection hole 1332. The mounting hole 1331 and the connection hole 1332 are in communication with each other. A diameter of the mounting hole 1331 is equal to the diameter of the head 212.

The third drive apparatus 131 further includes mounting posts 1314, one end of the mounting posts 1314 being disposed on a connecting surface 1316 of the third rotating portion 1312. There are three mounting posts 1314 in total, which are uniformly distributed around the third rotating shaft 1313 and surround the third rotating shaft 1313. A projection of the mounting post 1314 on the connecting surface 1316 of the third rotating portion 1312 and the camera 210 is arc-shaped, that is, a side face (that is, an inner side face) of the mounting post 1314 close to the third rotating shaft 1313 is an arc surface whose diameter is equal to the diameter of the base 211. A side face (that is, an outer side face) of the mounting post 1314 away from the third rotating shaft 1313 is also an arc surface whose diameter is equal to a diameter of the connection hole 1332. An external thread is provided on the outer side face of the mounting post 1314, the connection hole is a threaded hole, and the other end of the mounting post 1314 is connected to the fixing base 133 in a threaded manner. The mounting post 1314 is sleeved on the camera 210, and the camera 210 is fixed to the third rotating portion 1312. The other ends of the three mounting posts 1314 are located in the connection hole 1332 and are distributed around the base 211 in the camera 210. The three mounting posts 1314 clamp the camera 210 together to ensure extremely high coaxially of the camera 210 and the third rotating shaft 1313 in the third drive apparatus 131, thereby improving the control accuracy of the camera 210.

In the gimbal 100 of the embodiment of the present invention, the axis of the third rotating shaft 1313 and the optical axis of the camera 210 in the load 200 overlap, which may not only reduce a size of the gimbal 100 but also achieve high accuracy and good stability of controlling the load 200 carried on the gimbal 100 by the gimbal 100.

It should be finally noted that the above embodiments are merely intended for describing the technical solutions of the present invention rather than limiting the present invention. Based on the idea of the present invention, the technical features in the foregoing embodiments or different embodiments may be combined, the steps may be implemented in any order, and many other changes in the different aspects of the present invention as described above may exist. For brevity, such changes are not provided in the detailed descriptions. Although detailed description has been given to the present invention with reference to the embodiments, it should be understood by those skilled in the art that: they can still make modifications to the technical solutions described in the foregoing embodiments or make equivalent substitutions to some technical features thereof, without departing from scope of the technical solutions of the embodiments of the present invention.

What is claimed is:

1. A gimbal configured to carry a load, wherein the gimbal comprises:
    a first rotating member comprising a first drive apparatus, the first drive apparatus comprising a first rotating portion;
    a second rotating member comprising a second drive apparatus and a first connecting arm, the second drive apparatus comprising a second fixing portion and a second rotating portion that may rotate relative to the second fixing portion, the first connecting arm being fixedly connected between the first rotating portion and the second fixing portion, and the first connecting arm being integrally formed with the first rotating portion and the second fixing portion; and
    a third rotating member, the third rotating member comprising a third drive apparatus and a second connecting arm, the third drive apparatus comprising a third fixing portion, a third rotating portion and a third rotating shaft, the third rotating portion rotating relative to the third fixing portion about the third rotating shaft;
    wherein the second connecting arm being fixedly connected between the second rotating portion and the third fixing portion, and the third rotating portion being configured to be fixedly connected to the load and driving the load to rotate relative to the third fixing portion;
    wherein the second connecting arm is integrally formed with the second rotating portion and the third fixing portion;
    wherein the load comprises a camera and a housing, the camera being disposed in the housing;
    the third rotating portion being configured to be fixedly connected to the camera and the housing, and an axis of the third rotating shaft in the third drive apparatus and an optical axis of the camera overlapping;
    wherein the third rotating member comprises plurality of mounting posts, one end of the plurality of mounting posts being disposed on a connecting surface of the third rotating portion, and the other end being configured to clamp the camera.

2. The gimbal according to claim 1, wherein the first drive apparatus comprises a first fixing portion and a first rotating shaft, the first rotating portion rotating relative to the first fixing portion about the first rotating shaft; and
    wherein the second drive apparatus comprises a second rotating shaft. the second rotating portion rotating relative to the second fixing portion about the second rotating shaft.

3. The gimbal according to claim 1, wherein at least one of the first drive apparatus, the second drive apparatus and the third drive apparatus is a disc-type motor.

4. The gimbal according to claim 1, wherein there are three mounting posts in total, which are uniformly distributed around the third rotating shaft and surround the third rotating shaft.

5. The gimbal according to claim 1, wherein the third rotating member comprises a fixing base, the fixing base being a hollow cylinder; the mounting posts being sleeved on the camera, and the mounting posts and the camera being mounted in the fixing base.

6. An unmanned aerial vehicle (UAV) comprising:
    a fuselage;
    a load; and
    the gimbal according to claim 1, the gimbal carrying the load, a first rotating member in the gimbal being mounted to the fuselage.

* * * * *